United States Patent [19]

Smith

[11] 3,975,241
[45] Aug. 17, 1976

[54] DISTILLATION APPARATUS

[75] Inventor: Verity C. Smith, Dedham, Mass.

[73] Assignee: Vaponics, Inc., Plymouth, Mass.

[22] Filed: July 23, 1970

[21] Appl. No.: 57,435

[52] U.S. Cl. .................................. 202/202; 202/197; 202/200; 203/10; 203/40; 203/DIG. 17
[51] Int. Cl.² .......................................... B01D 3/00
[58] Field of Search ........... 202/202, 203, 204, 197, 202/200, 182; 203/DIG. 17, 10, 11, 40; 55/195, 39, 208, 42

[56] References Cited
UNITED STATES PATENTS

| | | | |
|---|---|---|---|
| 1,550,116 | 8/1925 | Smith | 55/195 |
| 2,663,547 | 12/1953 | Evans, Jr. et al. | 55/195 |
| 3,094,165 | 6/1963 | Droescher | 55/195 |
| 3,401,091 | 9/1968 | Gidner | 203/11 |

*Primary Examiner*—Wilbur L. Bascomb, Jr.
*Attorney, Agent, or Firm*—Kenway & Jenney

[57] ABSTRACT

By the use of a degassing chamber within distillation apparatus dissolved volatile material is expelled and water of enhanced purity is produced. The chamber is designed such that the distillate is forced to flow along a shallow, horizontal path kept hot enough to boil it, before exiting from the distillation unit.

2 Claims, 2 Drawing Figures

U.S. Patent  Aug. 17, 1976  3,975,241
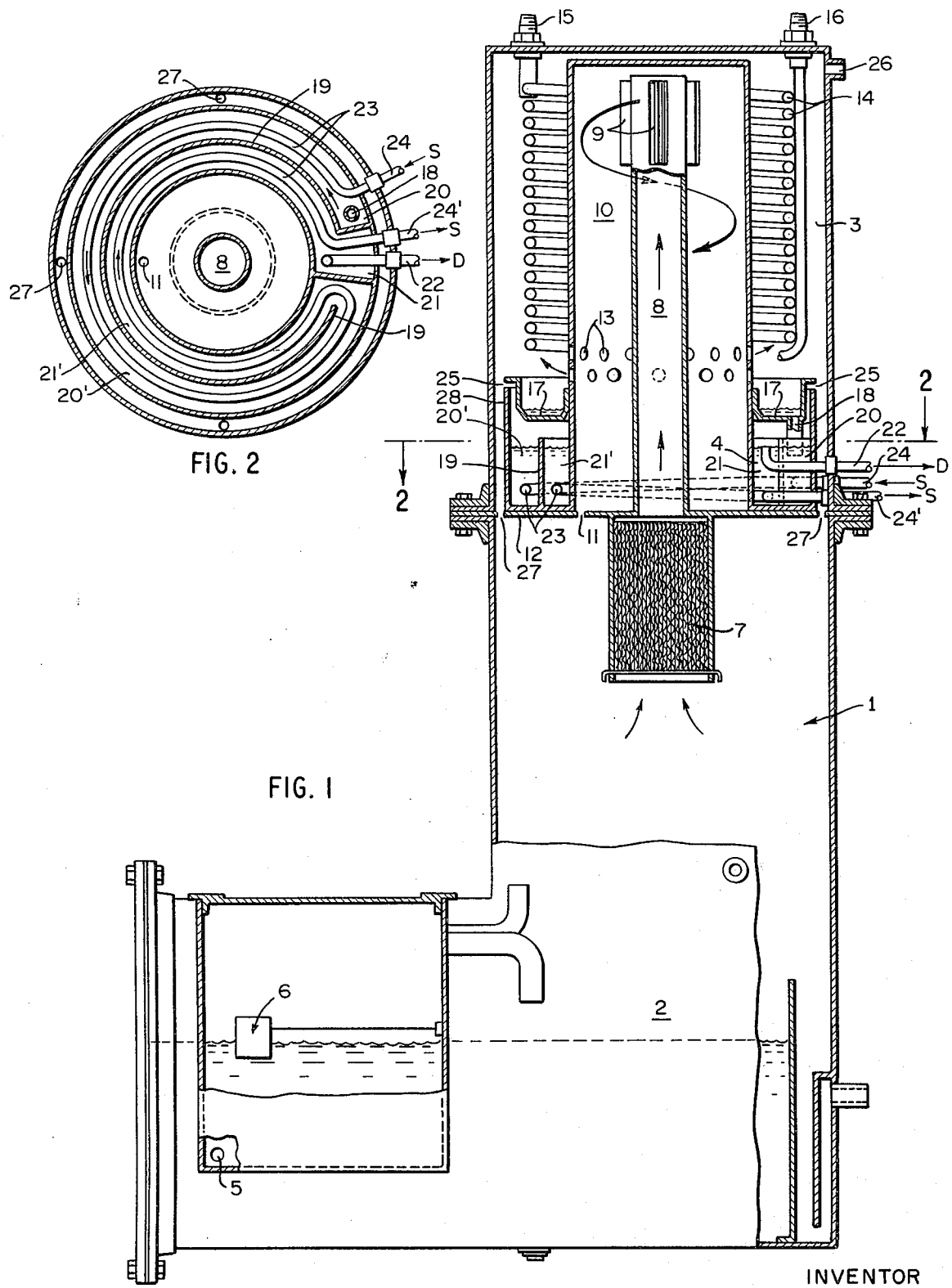

DISTILLATION APPARATUS

This invention relates to water distillation and provides apparatus for producing distillate of enhanced purity. More particularly this invention resides in a reboiling device incorporated in water distillation apparatus.

Distillation is an effective method of separating dissolved non-volatile material from water, but is of limited effectiveness in producing water of extreme purity because soluble gases and other volatile materials carry over into the distillate. Methods have been proposed to deal with this problem, notably degassing chambers in which the distillate is reboiled and volatile material is driven off by heat and the boiling action. The use of methods such as reboiling will increase product purity, but present certain disadvantages.

Conventionally designed reboilers often result in the loss of distillate product thereby decreasing the input to output efficiency of the distillation unit. Since conventional degassing chambers are most often separate pieces of equipment, that is, isolated from the distillation unit, any distillate vaporized during reboiling is vented to the atmosphere along with expelled volatile material.

It is a principal object of this invention to provide for degassing or reboiling in a manner producing distillate of a significantly higher degree of purity, as determined by its ohmic resistivity, than has been easily obtained in the past. It is an additional object to provide a degassing or reboiling unit within the distillation apparatus to insure that distillate vaporized during reboiling will be recondensed, thereby eliminating the problem of lost product or decreased efficiency.

It has been found that distillate purity can be greatly increased by combining the advantage of reboiling, that is the dislodging effect, with the principle that the efficiency of reboiling, that is, the amount of volatile material removed, increases with the amount of time the distillate is allowed to boil. The problem is providing a distillation system with equipment that is designed first to create the holdup time necessary to sufficiently utilize the above described principle and second to be used in a continuous operation.

It is therefore another object of this invention to provide equipment that can create the necessary holdup time and that can be used in a continuous operation.

The invention provides a degassing chamber located within the distillation apparatus between the still and the condenser which contains a baffling arrangement defining a long, winding, continuous, relatively shallow, horizontal path through which the condensate must flow before exiting from the distillation unit. This path is designed so that the time necessary for the distillate to flow from its inlet to its outlet is optimum for the stripping of dissolved volatile material. The length of this path depends on the desired output rate or flow rate of the particular distillation unit, and can be increased or decreased by adding or removing baffling sections defining the path. The chamber is equipped with a tray shaped cover arrangement located directly beneath the condensing coils which catches the falling condensate and channels it, through a down spout, to the beginning of the path in the chamber below. The chamber is also equipped with heating means located along the length of the path. The heating means, as for example a steam pipe, is designed to insure that the condensate boils throughout the entire length of the path. The chamber is also provided with a venting arrangement designed to allow any material expelled from any point along the path to exit into the venting system of the distillation unit and designed to prevent falling condensate from entering the chamber through it. An effective venting arrangement is illustrated in the preferred embodiment of the invention described in detail below.

A preferred embodiment of this invention is illustrated in the accompanying drawings.

FIG. 1 is a verticle cross-sectional view of the apparatus of this invention.

FIG. 2 is a top view of the apparatus of FIG. 1 taken through line 2—2.

Referring to FIG. 1 a distillation apparatus 1 is provided with a lower distillation zone 2, an upper condensation zone 3 and the degassing chamber 4. Impure water is introduced into the distillation zone 2 through inlet 5 controlled by float feeder 6 and is heated by means (not shown) to a temperature to distill the water therein. The distillate passes upwardly into filter 7 where entrained solid particles are separated therefrom, into a riser 8, through baffles 9 and into expansion zone 10. Any material which condenses in expansion zone 10 is recycled through hole 11 in plate 12 into the distillation zone 2.

The distillate exits from expansion zone 10 through holes 13, into condensation zone 3. The distillate passes upwardly contacting the condenser tubes 14 which are maintained cold by a coolant entering tubes 14 through inlet 15 and exiting from outlet 16. Condensate condensing in zone 3 drips down and is trapped in the trough-shaped chamber cover 17 and is channeled into the degassing chamber 4 through the down spout 18. The condensate flows from the entrance point 20 through the degassing chamber 4 along the path defined by baffle 19. The direction of flow is from point 20 to point 20', around the edge of baffle 19 and then from point 21' to 21. At point 21 the condensate is removed by means of an overflow outlet 22. Located within the chamber and along the entire length of the path defined by baffle 19 is a steam pipe 23, having its inlet 24 at point 20 and its outlet 24' at point 21. The pipe is completely submerged in the condensate at all points and is kept hot enough to boil the condensate throughout.

The degassing chamber is provided with a venting space 25 located between the chamber cover 17 and the outer chamber wall 28. Note that the cover 17 overlays 28 in such a way that no condensate can fall into the chamber through space 25 and therefore flowing of partially degassed condensate is prevented. To insure that any volatile material which is expelled from any point in the chamber can vent through space 25, the baffle 19 is made lower than the bottom of cover 17. All volatile material exiting from vent 25 flows upwardly and exits from the system through the main vent 26. Holes 27 are provided in plate 12 so that any condensed material which is not caught in the cover plate 17 is recycled into distillation zone 2.

Referring to FIG. 2 the relationship between the baffle 19, the steam pipe 23, the condensate down spout inlet 18 and the condensate outlet 22 are shown. Note that the steam pipe is located along the entire path and the position of the steam pipe inlet and outlet correspond to the position of the condensate inlet and outlet.

Distilled condensate produced by this preferred construction will ordinarily be of a purity represented by a resistivity in excess of $2 \times 10^6$ ohm-cms. depending on the extent to which the condensate collected in the reboiler is caused to reboil.

Although this invention has been described with specific reference to the preferred embodiment it is contemplated that modifications will readily occur to those skilled in the art and familiar with the principle herein set forth. In particular, as the ultimate purity will depend on the degree of reboiling, more or less may be provided for by controlling the heat source to the reboiler and controlling the extent to which the condensate is caused to channel prior to exciting. In a simple embodiment it may be sufficient to collect the condensate in the reboiler directly from the condenser without leading it to the beginning of the channel, to heat it in the reboiler by internal or external means, e.g. by an external strap heater, and to remove reboiled distillate at the exit end. Although the condensate collected at the exit end of the reboiler will be only briefly reboiled, the product will still be of enhanced purity because of intermixing with more extensively reboiled condensate from the upstream portion of the reboiler.

Having thus disclosed my invention and described in detail a preferred embodiment thereof, I claim and desire to secure by Letters Patent:

1. In a distillation apparatus which includes a vented housing enclosing a still and a condenser, the improvement comprising a reboiler within said housing arranged for collecting condensate from said condenser, said reboiler comprising means defining a long horizontal channel having an inlet for condensate at one end and an outlet at another end thereby providing means for channeling said condensate in a horizontal path from said inlet to said outlet, and means within said channel for heating the condensate therein.

2. The apparatus defined in claim (1) additionally including trapping means adapted to collect the condensate and means for discharging the condensate from said trapping means into the inlet of said reboiler upstream from said outlet.

* * * * *